United States Patent [19]
Robbins, III

[11] Patent Number: 5,487,494
[45] Date of Patent: Jan. 30, 1996

[54] DISPENSING CAP WITH INTERNAL MEASURING CHAMBER AND SELECTIVELY USEABLE SIFTER

[76] Inventor: Edward S. Robbins, III, 2802 E. Avalon Ave., Muscle Shoals, Ala. 35661

[21] Appl. No.: 220,530

[22] Filed: Mar. 31, 1994

Related U.S. Application Data

[63] Continuation-in-part of Ser. No. 288,896, Aug. 10, 1994, which is a continuation of Ser. No. 47,086, Apr. 16, 1993, abandoned, which is a continuation-in-part of Ser. No. 237,336, May 3, 1994, Pat. No. 5,465,871, which is a continuation of Ser. No. 979,042, Nov. 19, 1992, abandoned.

[51] Int. Cl.⁶ .................................................. B67D 5/38
[52] U.S. Cl. .................. 222/158; 222/189.03; 222/456
[58] Field of Search ........................... 222/142.1, 142.4, 222/154, 156, 157, 158, 189, 424.5, 425, 454, 456, 480, 481

[56] References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard . | |
| 2,214,437 | 9/1940 | Punte et al. | 206/42 |
| 2,339,644 | 1/1944 | Lucas | 222/425 X |
| 2,370,820 | 3/1945 | Stott | 222/454 |
| 2,449,285 | 9/1948 | Ekstrom | 222/548 |
| 2,784,884 | 3/1957 | Borie, Jr. | 222/336 |
| 2,804,103 | 8/1957 | Wall | 141/381 |
| 2,811,281 | 10/1957 | Donovan | 222/154 X |
| 2,840,124 | 6/1958 | Greene | 222/212 X |
| 2,844,266 | 7/1958 | Hofe | 215/244 |
| 2,969,167 | 1/1961 | Libit | 222/512 |
| 2,985,343 | 5/1961 | Mask | 222/442 |
| 3,020,659 | 2/1962 | Paulini | 40/307 |
| 3,033,420 | 5/1962 | Thomas et al. | 222/1 |
| 3,140,799 | 7/1964 | Mehr | 222/519 X |
| 3,424,355 | 1/1969 | Blumen | 222/450 |
| 3,486,665 | 12/1969 | La Croce | 222/480 |
| 3,512,681 | 5/1970 | Frankel | 222/158 |
| 3,860,111 | 1/1975 | Thompson | 206/534 |
| 3,948,105 | 4/1976 | Johnson, Jr. | 73/427 |
| 4,069,935 | 1/1978 | Hampel | 220/377 X |
| 4,079,859 | 3/1978 | Jennings | 222/1 |
| 4,083,467 | 4/1978 | Mullins et al. | 220/90.4 |
| 4,144,989 | 3/1979 | Joy | 222/438 |
| 4,164,301 | 8/1979 | Thayer | 220/253 |
| 4,209,100 | 6/1980 | Uhlig | 215/216 |
| 4,292,846 | 10/1981 | Barnett | 73/427 |
| 4,298,038 | 11/1981 | Jennings | 141/2 |
| 4,318,500 | 3/1982 | Melikian | 222/425 |
| 4,346,823 | 8/1982 | Eppenbach | 222/443 |

(List continued on next page.)

FOREIGN PATENT DOCUMENTS

| 580339 | 8/1958 | Italy . |
| 613958 | 12/1960 | Italy . |

Primary Examiner—Andres Kashnikow
Assistant Examiner—Joseph A. Kaufman
Attorney, Agent, or Firm—Nixon & Vanderhye

[57] ABSTRACT

A measuring/dispensing cap adapted for attachment to an open, upper end of a container includes a top and a peripheral skirt extending downwardly from the top. A weir panel separates the peripheral skirt into upper and lower sections, the upper section comprising a measuring chamber defined by the top, the upper section of the skirt and the weir panel. The lower section includes screw threads for attaching the cap to the open upper end of the container. The weir panel is formed with a weir aperture on one side of a diametrical centerline extending across the panel, the weir aperture defined in part by a weir edge extending parallel to and spaced from the centerline. The top includes a dispensing door pivotally secured to the skirt and having a hinge axis parallel to the centerline and the weir edge. A portion of the door opposite the hinge lies on the other side of the diametrical centerline. A sifter disk underlies the weir panel and is rotatable relative thereto. The weir panel includes a cut out and a plurality of sifter apertures allowing the user to choose a non-sifting or sifting mode of operation by rotating either the cut out or the sifting apertures into alignment with the weir aperture.

17 Claims, 1 Drawing Sheet

U.S. PATENT DOCUMENTS

| | | | |
|---|---|---|---|
| 4,376,497 | 3/1983 | Mumford | 222/153 |
| 4,399,928 | 8/1983 | Klingler | 215/237 X |
| 4,544,063 | 10/1985 | Neward | 206/540 |
| 4,580,687 | 4/1986 | Lewis | 220/254 X |
| 4,606,481 | 4/1986 | Conti et al. | 222/562 |
| 4,610,371 | 9/1986 | Karkiewicz | 220/266 |
| 4,613,057 | 9/1986 | Sacchetti et al. | 221/265 |
| 4,635,828 | 1/1987 | Kaufman | 222/185 |
| 4,643,881 | 2/1987 | Alexander et al. | 422/265 |
| 4,646,948 | 3/1987 | Jennings | 222/454 |
| 4,691,821 | 9/1987 | Hofmann | 206/216 |
| 4,693,399 | 9/1987 | Hickman et al. | 222/480 |
| 4,714,181 | 12/1987 | Kozlowski et al. | 222/480 |
| 4,723,693 | 2/1988 | DeCoster | 222/483 |
| 4,802,597 | 2/1989 | Dubach | 215/307 |
| 4,898,292 | 2/1990 | VerWeyst et al. | 215/237 |
| 4,930,688 | 6/1990 | Arona-Delonghi | 222/484 |
| 4,936,494 | 6/1990 | Weidman | 222/480 |
| 4,955,513 | 9/1990 | Bennett | 222/480 |
| 4,961,521 | 10/1990 | Eckman | 222/142.5 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,139,181 | 8/1992 | VerWeyst | 222/480 |
| 5,305,931 | 4/1994 | Martin et al. | 222/480 |
| 5,383,582 | 1/1995 | Baxter et al. | 222/480 X |

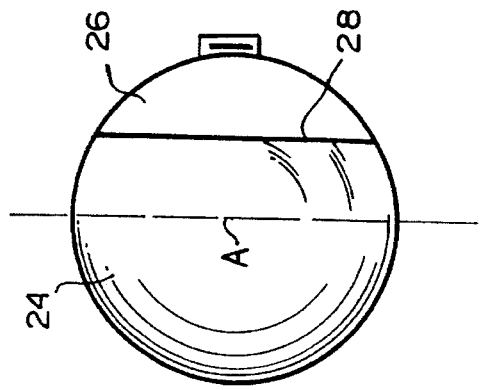
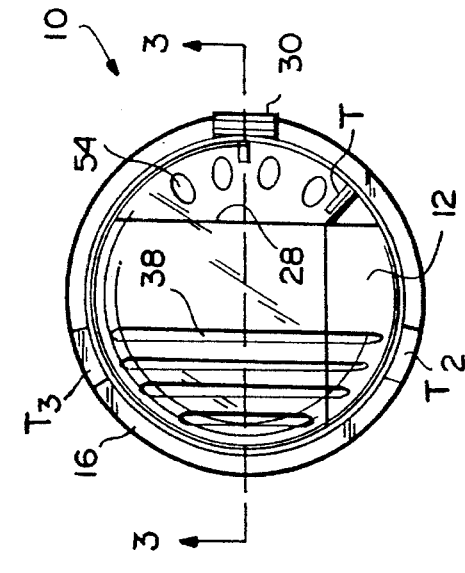
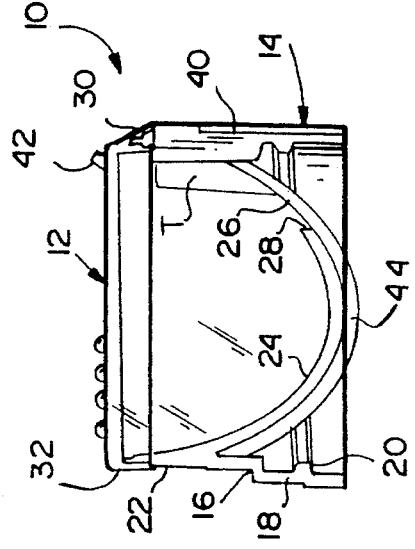
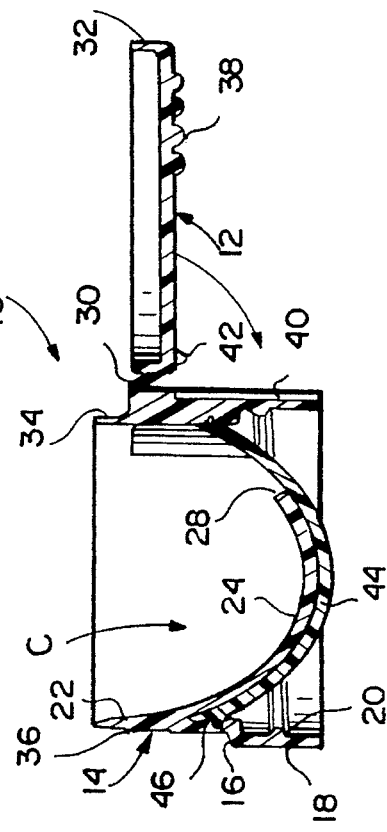
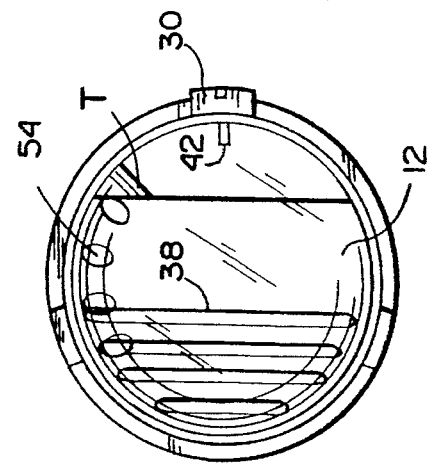
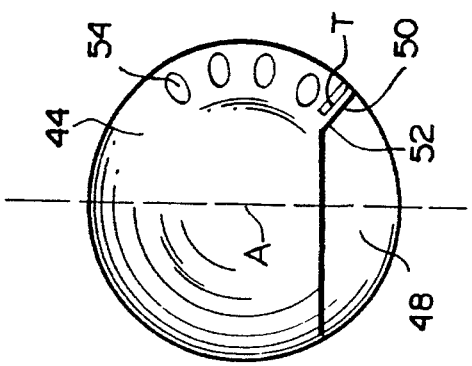

DISPENSING CAP WITH INTERNAL MEASURING CHAMBER AND SELECTIVELY USEABLE SIFTER

RELATED APPLICATIONS

This application is a continuation-in-part of commonly owned copending application No. 08/288,896 filed Aug. 10, 1994, now allowed which is a File Wrapper Continuation application of Ser. No. 08/047,086 filed Apr. 16, 1993, now abandoned, and which in turn, is a continuation-in-part of commonly owned application Ser. No. 08/237,336 filed May 3, 1994, now U.S. Pat. No. 5,465,871, which is a File Wrapper Continuation application of Ser. No. 07/979,042 filed Nov. 19, 1992, now abandoned.

BACKGROUND AND SUMMARY OF THE INVENTION

The present invention relates generally to dispensing containers and, more specifically, to dispensing cap constructions enabling accurately measured amounts of the container contents (in granular, particulate or powdered form) to be dispensed from the cap.

Dispensing containers are, of course, well known and are used in many different industries for many different purposes. One such use is in the food industry, and a specific example includes jars and other similar containers which contain solid foods (such as spices) in particulate, granular or powder-like form. Typically, a measuring spoon or separate measuring cup is utilized in conjunction with the jar or container when accurate amounts are to be obtained.

The present invention eliminates the need for measuring spoons or cups by providing a hollow cap, which serves as its own measuring device, for use with an otherwise conventional container. While the incorporation of a measuring function into a container/cap construction for the discharge of desired amounts of the container contents is not new (see for example, U.S. Pat. Nos. 1,802,284; 2,804,103; 3,860, 111; 4,613,057 and 4,635,828), the present invention provides improved and simplified structures for accomplishing this result, while generally retaining the desirable option of substantially unrestricted pouring and/or shaking of the container contents from the dispensing cap.

In addition, the present invention provides a selectively useable sifter within the measuring cap construction which enables the user to sift the container contents in either the unmeasured or measured dispensing modes.

In one exemplary embodiment of the invention, a transparent plastic cap is provided which includes a top and a depending skirt. The skirt incorporates an inverted dome-like weir panel provided with a weir aperture lying on one side of a center line extending through the cap. The weir panel, in combination with the skirt wall and the cap top wall, form a measuring chamber into which a desired amount of container contents may be poured via the weir aperture. In this exemplary embodiment, the cap top wall forms a fully openable dispensing door integrally hinged at the juncture of the cap skirt and cap top wall. The free edge of the cap, which is diametrically opposed to the integral hinge, lies on the opposite side of the cap center line from the weir aperture. The cap top wall (and optionally a portion of the depending skirt) is provided with volume gradations in the form of level lines and suitable alpha and/or numeric characters, enabling the user to precisely transfer measured amounts of contents from the container into the cap measuring chamber.

A sifting disk, having a curvature complementary to that of the weir panel, is snap-fit into (or otherwise suitably attached to) the dispensing cap in underlying engagement with the weir panel, for rotation relative thereto. This sifter disk is formed with a generally chord-shaped cut-out substantially of the same shape as the weir aperture in the weir panel, and rotatable into alignment with the weir aperture. At the same time, adjacent the cut-out, a series of sifter apertures are provided. In addition, a vertical tab is provided on the sifter disk which extends upwardly through the weir aperture in the weir panel. This permits the user to rotate the sifter disk to either of two positions: (1) a first position wherein the sifter disk cut-out underlies the weir aperture so that, with the dispensing door closed, the user can transfer measured amounts of container contents into the measuring chamber. With the dispensing door open, the user can simply free flow unrestricted amounts of container contents through the cap; and (2) a second position where the sifter apertures are superposed under the weir aperture enabling the user to dispense container contents through the sifter apertures, using a typical back and forth shaking motion. Here again, the dispensing door may be open or closed. If open, the user can sift unrestricted amounts of container contents through the cap and, if closed, the user can sift measured amounts into the measuring chamber. In order to enable the free discharge of sifted or unsifted material from the cap, the dispensing door formed by the top wall of the cap may be fully opened and releasably held against the exterior of the depending skirt portion by means of a locking tab and cooperating locking groove channel arrangement.

In the preferred arrangement, the dispensing cap is formed as a two-piece construction, i.e., the depending skirt and the top wall/dispensing door are formed as a single piece along with the weir panel; and the sifter disk is separately formed and insertable within the dispensing cap in the manner described above. In an alternative arrangement, the dispensing door could be formed separately and simply snap-fit onto the top of the cap, or hinged by a pin or other suitable means. In the preferred arrangement, the dispensing door and cap are integrally formed, and both components of this two-piece dispenser cap construction are made of transparent plastic material to facilitate accurate transfer the container contents from the container into the dispensing chamber. On the other hand, the sifter disk in this arrangement may be constructed of an opaque plastic material to create a contrast with the remainder of the dispensing cap. For that embodiment where the dispensing door/top wall is formed separately, the depending skirt portion, weir panel and sifting disk may be formed of opaque plastic material and the separately formed top wall/dispensing door formed of a transparent plastic material.

Thus, in its broader aspects, the present invention relates to a measuring/dispensing cap adapted for attachment to an open upper end of a container, the cap comprising first means for enabling an accurately determined amount of container contents to be dispensed from the cap in a first operating mode; second means for enabling substantially unrestricted pouring of container contents through the cap in a second operating mode; and third means for enabling sifting of container contents in either of the first or second modes.

Other objects and advantages of the invention will become apparent from the detailed description which follows.

BRIEF DESCRIPTION OF THE DRAWINGS

FIG. 1 is a side section of a dispensing cap in accordance with this invention;

FIG. 2 is a top plan view of the dispensing cap shown in FIG. 1 and with the sifter disk in a sifting position;

FIG. 3 is a side section of the dispensing cap of this invention taken along the line 3—3 of FIG. 2 and with the dispensing door shown in an open position;

FIG. 4 is a top plan view of the dispensing cap shown in FIG. 1 but with the sifter rotated to a flow thru position;

FIG. 5 is a plan view of the cap, with dispensing door and sifter panel removed for clarity; and FIG. 6 is a plan view of the cap with dispensing door and weir panel removed for clarity.

DETAILED DESCRIPTION OF THE DRAWINGS

With reference now to FIGS. 1 and 2, the measuring/dispensing cap 10 includes a top or cover 12 and a depending skirt portion 14. The depending skirt portion includes an annular shoulder 16 defining a lower skirt portion 18 with internal screw threads 20 adapted to cooperate with external threads on the upstanding dispensing portion of a container or a jar (not shown) in the manner of a typical threaded closure. Substantially all of the dispensing cap defines a Volumetric space or chamber C from which measured amounts of contents can be dispensed as described in greater detail below. The volumetric space or chamber C is defined by an upper portion 22 of the depending skirt, the cap top wall/dispensing door 12, and a weir panel 24 which may be integrally formed with the cap. This weir panel 24 has an inverted dome-like shape and a dispensing or weir aperture 26 of generally chordal shape partially defined by a weir edge 28. The edge 28 lies to the aperture side of a diametrical center line A extending across the cap, i.e., the aperture lies wholly on one side of the center line, and the edge 28 is spaced from that center line, thereby enabling the weir panel to effectively perform a dam function as also described in greater detail below.

The dispensing door for the cap in this exemplary embodiment includes the entire top wall or cover 12 which is pivotally secured to the depending skirt 14 by an integral hinge 30. The dispensing door is formed with a peripheral rim 32 which is designed to telescope over the uppermost edge 34 of the depending skirt 14 and to seat on an annular radial shoulder 36. It will be appreciated, however, that the dispensing door 12 and the uppermost edge of the cap depending skirt may be provided with cooperating snap elements or other releasable locking means to hold the dispensing door in a closed position when not in use. The dispensing door is also provided with volume gradations 38 which may, if desired, continue along adjacent portions of the depending skirt 14.

In the area of the integral hinge 30, a thickened rib extends axially downwardly along the depending skirt and this rib is provided with a relatively thin locking channel 40 extending downwardly along the depending skirt. At the same time, the exterior surface of the dispensing door is provided with a locking tab 42 adjacent the hinge. This enables the dispensing door to be swung to a fully open position with the locking tab 42 releasably secured within the locking channel 40.

In accordance with this continuation-in-part application, a sifter disk 44 is provided which has an inverted dome-like shape substantially similar to the shape of the weir panel 24. The sifter panel or disk 44 is insertable within the dispensing cap from below the depending skirt 18 to the position shown in FIG. 1 where the sifter disk is shown in underlying relationship to the weir panel 24. Disk retainers in the form of or a solid annular rib 46 seated in an annular groove in the interior surface of skirt 18 hold the sifter disk in place within the dispensing cap. By reason of the complementary shape of the sifter disk, the latter is rotatable about a vertical axis, relative to the stationary weir panel.

The sifter disk 44 is formed with a cut-out 48 (FIG. 6) having a shape substantially similar to the weir aperture 26 formed in the weir panel 24. This cut-out 48 terminates at an angled edge 52 where a thin upstanding tab T or handle extends vertically relative to the disk. This tab T, which extends upwardly through the weir aperture 26, enables the user to rotate the sifter disk from above (with the dispensing door 12 open) to the desired position without having to remove the dispensing cap 10 from the container. Adjacent the tab T, and extending in a direction away from the sifter disk cut-out, there are a plurality of sifter apertures 54. These apertures are spaced and numbered such that when the sifter disk 44 is moved to the position shown in FIG. 2, the sifter apertures are substantially centered within the weir aperture 26.

With specific reference to FIG. 2, it will be appreciated that by moving the tab T in a counterclockwise direction to the FIG. 4 position, the sifter disk apertures 54 will be moved under a solid portion of the weir panel 24 and the sifter disk cut-out 48 will be moved into substantially underlying relationship with the weir aperture 26. In this position (or first operating mode), the dispensing cap is used to transfer measured amounts of container contents from the container into the volumetric dispensing or measuring chamber C. This is done with the top wall/dispensing door 12 in the closed position. The user may then tilt the container in such a way that the contents will spill over the weir edge 28 through the weir aperture 28 and into the volumetric space or measuring chamber C. When the container is so tilted, the user may easily determine the volume of contents transferred to the space C with the assistance of the volumetric indicators 38. When the desired amount of contents have been transferred to the chamber C, the dispensing door 12 may be flipped open with the aid of tabs $T_2$ and $T_3$, and the contents poured out of the dispensing cap. Because of the diametrically opposed relationship between the weir panel aperture 26 and the dispensing door free edge (the edge opposite the hinge), the contents within the chamber may be poured out of the cap through the door without additional contents spilling over the weir edge 28. In other words, the weir panel 26 in this tilted orientation acts as a dam, the height of which (as defined by the weir edge 28), is sufficient to block unwanted flow of material into the chamber C as the already measured amount is discharged through the dispensing door. The reason for this is simply that the degree of tilt required to discharge the measured amount out of the cap via door 12 is less than the degree of tilt required to cause the contents to spill over the weir edge 28 and into the chamber C. This action, of course, is facilitated by the curvature provided in the weir panel 26 which in effect provides a ramp for the measured amount to slide toward the dispensing door.

With the sifter disk 44 in this first position, the user may also simply pour the container contents straight through the weir aperture 26, cut out 48 and through the open door 12 without regard for the amount dispensed. To facilitate such unrestricted pouring, the door 12 may be swung to its fully open position, with tab 42 frictionally engaged in channel or groove 40.

In an alternative second mode of operation, the user may rotate the sifter disk to the position illustrated in FIG. 2. In this position, and with the door 12 closed, the user may shake an accurately measured amount of container contents through the sifting apertures 54 and into the chamber C. Alternatively, the door 12 again may be opened fully (with the locking tab 42 is frictionally engaged within the locking channel 40), so that the user may then shake the container in the usual manner to allow sifted material to flow directly from the container out of the dispensing cap without concern for the amounts dispensed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A measuring/dispensing cap adapted for attachment to an open, upper end of a container, the cap comprising first means for enabling an accurately determined amount of container contents to be dispensed from the cap in a first operating mode; second means for enabling substantially unrestricted pouring of container contents through the cap in a second operating mode; and third means for enabling sifting of container contents in either of said first or second modes; wherein said first means includes a weir panel within said cap, said weir panel having a weir aperture defined partly by a straight weir edge in combination with a dispensing door in a closed position; and wherein said second means includes said first means in combination with the dispensing door in an open position; and wherein said third means comprises a sifter disk underlying said weir panel and rotatable relative thereto, said sifter disk formed with a cut out rotatable into alignment with said weir aperture in a first sifter disk position, and a plurality of sifter apertures adjacent said cut out and rotatable into alignment with said weir aperture in a second sifter disk position.

2. The measuring/dispensing cap of claim 1 and including means for rotating said sifter disk between said first and second positions.

3. The measuring/dispensing cap of claim 1 wherein said cap is formed entirely of transparent plastic material.

4. A measuring/dispensing cap adapted for attachment to an open, upper end of a container, the cap comprising:

a top and a peripheral skirt extending downwardly from said top; a weir panel separating said peripheral skirt into upper and lower sections, the upper section comprising a measuring chamber defined by said top, said upper section of said skirt and said weir panel, and the lower section including means for attaching said cap to the open upper end of the container; and wherein at least one of said top and upper section of said peripheral skirt is provided with volume indicators; said weir panel formed with a weir aperture on one side of a diametrical centerline of said caps, said weir aperture defined in part by a weir edge extending parallel to and spaced from said centerline; said top comprising a dispensing door pivotally secured to said skirt and having a hinge axis parallel to said centerline and said weir edge, and wherein a portion of the door opposite said hinge axis lies on the other side of said diametrical centerline; and a sifter disk underlying said weir panel and rotatable relative thereto.

5. The measuring/dispensing cap of claim 4 wherein said sifter disk is formed with a cut out of substantially similar size and shape as said weir aperture and with a plurality of sifting apertures arranged in an array adjacent said cut out.

6. The measuring/dispensing cap of claim 5 wherein said sifter disk includes a vertical tab extending upwardly through the weir aperture to thereby enable rotation of the sifter disk from a first position where said cut out underlies said weir aperture to a second position where said sifter apertures underlie said weir aperture.

7. The measuring/dispensing cap of claim 4 wherein said cap is formed entirely of transparent plastic material.

8. The measuring/dispensing cap of claim 4 wherein said dispensing door is integrally hinged to said skirt.

9. The measuring/dispensing cap of claim 4 wherein said dispensing door and said peripheral skirt are formed with cooperable means for holding said dispensing door in a fully open position.

10. The measuring/dispensing cap of claim 4 wherein at least said top is formed of substantially transparent material.

11. The measuring/dispensing cap of claim 4 wherein said weir panel is substantially dome-shaped.

12. The measuring/dispensing cap of claim 4 wherein said weir panel and said sifter disk are substantially dome-shaped.

13. A measuring/dispensing cap adapted for attachment to an open, upper end of a container, the cap comprising:

a top and a peripheral skirt extending downwardly from said top; a weir panel separating said peripheral skirt into upper and lower sections, the upper section comprising a measuring chamber defined by said top, said upper section of said skirt and said weir panel, and the lower section including means for attaching said cap to the open upper end of the container; and wherein at least one of said top and upper section of said peripheral skirt is provided with volume indicators; said weir panel formed with a weir aperture on one side of a diametrical centerline of said cap, said weir aperture defined in part by a weir edge extending parallel to and spaced from said centerline; said top comprising a dispensing door having a hinge axis parallel to said centerline and said weir edge, and wherein a portion of the door opposite said hinge axis lies on the other side of said diametrical centerline; and a sifter disk located vertically adjacent said weir panel, said sifter disk formed with a cut out of substantially similar size and shape as said weir aperture and with a plurality of sifting apertures arranged in an array adjacent said cut out, and wherein said weir aperture and said cut out are vertically alignable in a first operating mode, and wherein said sifting apertures and said weir aperture are vertically alignable in a second operating mode.

14. The measuring/dispensing cap of claim 13 wherein said sifter disk underlines said weir panel and wherein said sifter disk includes a vertical tab extending upwardly through a weir aperture to thereby enable rotation of the sifter disk.

15. The measuring/dispensing cap of claim 13 wherein said cap is formed entirely of transparent plastic material.

16. The measuring/dispensing cap of claim 13 wherein said dispensing door is integrally hinged to said skirt.

17. The measuring/dispensing cap of claim 13 wherein said weir panel and said sifter disk are substantially dome-shaped.

* * * * *